(12) United States Patent
Ohtani

(10) Patent No.: US 7,044,108 B2
(45) Date of Patent: May 16, 2006

(54) FUEL INJECTION CONTROL APPARATUS AND FUEL INJECTION CONTROL METHOD FOR INTERNAL COMBUSTION ENGINE

(75) Inventor: Motoki Ohtani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/983,781

(22) Filed: Nov. 9, 2004

(65) Prior Publication Data

US 2005/0098157 A1  May 12, 2005

(30) Foreign Application Priority Data

Nov. 11, 2003  (JP) ............... 2003-381537

(51) Int. Cl.
  *F02B 7/00*  (2006.01)
(52) U.S. Cl. ...................... 123/431; 123/299
(58) Field of Classification Search ............... 123/431, 123/299, 300
  See application file for complete search history.

(56) References Cited

U.S. PATENT DOCUMENTS 5,924,405 A * 7/1999 Hashimoto ............... 123/431
5,941,209 A * 8/1999 Hashimoto ............... 123/295
6,915,784 B1 * 7/2005 Tomoda et al. ............ 123/431

FOREIGN PATENT DOCUMENTS

| JP | 01-313672 | 12/1989 |
|----|-----------|---------|
| JP | 05-231221 | 9/1993 |
| JP | 11-093731 | 4/1999 |
| JP | 2000-227043 | 8/2000 |
| JP | 2000-249020 | 9/2000 |

* cited by examiner

*Primary Examiner*—Mahmoud Gimie
(74) *Attorney, Agent, or Firm*—Kenyon & Kenyon LLP

(57) ABSTRACT

An internal combustion engine includes an in-cylinder injection valve and an intake port injection valve. An ECU controls the fuel injection valves in a fuel injection mode that corresponds to an operational state of the engine. When deterioration of the combustion state is detected while the engine operational state is in a predetermined operational region where fuel is injected at least from the in-cylinder injection valve, the ECU switches the fuel injection mode such that the ratio of the amount of fuel injected from the in-cylinder injection valve to the entire amount of fuel supplied to the cylinder is decreased. As a result, the engine combustion state is prevented from deteriorating while suppressing noise generated in the fuel pressurizing and supplying system.

16 Claims, 3 Drawing Sheets

FUEL INJECTION CONTROL APPARATUS AND FUEL INJECTION CONTROL METHOD FOR INTERNAL COMBUSTION ENGINE

BACKGROUND OF THE INVENTION

The present invention relates to an apparatus and a method for controlling fuel injection in an internal combustion engine that includes a first fuel injection valve for injecting fuel into a cylinder and a second fuel injection valve for injecting fuel into an intake passage.

Japanese Laid-Open Patent Publication No. 5-231221 discloses an internal combustion engine that has an in-cylinder injection valve for injecting fuel into a cylinder and an intake port injection valve for injecting fuel toward an intake port, and switches the fuel injection mode of each injection valve as necessary. In such an internal combustion engine that has two types of fuel injection valves, the pressure of fuel injected from the in-cylinder injection valve, that is, the pressure of fuel that is supplied to the in-cylinder injection valve, is set higher than the pressure of fuel injected from the intake port injection valve. This is because the in-cylinder injection valve needs to inject fuel against the high pressure in the cylinder, and because fuel needs to be adequately atomized to maintain a favorable combustion state.

In a fuel pressurizing and supplying system for supplying highly pressurized fuel to the in-cylinder injection valve, fuel drawn up from a fuel tank is pressurized by a high pressure pump to a high pressure. The pressurized fuel is supplied to a delivery pipe and then to the in-cylinder injection valve connected to the delivery pipe. In the fuel pressurizing and supplying system, mechanical noise due to supplying of highly pressurized fuel is generated. For example, valve noise, or noise of a valve body hitting a valve seat in a spill valve, in the high pressure fuel pump and similar noise in the in-cylinder injection valve are generated. Such noise generated in the fuel pressurizing and supplying system disturbs a driver of the vehicle particularly when the engine is idling or operated at a low load.

The combustion rate of fuel injected from an in-cylinder injection valve is generally greater than the combustion rate of fuel injected from an intake port injection valve. Therefore, in addition to the mechanical noise generated in the fuel pressurizing and supplying system, combustion noise due to increase in the combustion rate becomes a problem.

Measures for suppressing noise generated in fuel pressurizing and supplying systems and noise due to combustion rate include, for example, a method for lowering the pressure of fuel supplied to an in-cylinder injection valve. Such control for lowering the fuel pressure suppresses the valve noise of a spill valve and that of an in-cylinder injection valve. Further, since such control lowers the pressure of fuel injected from an in-cylinder injection valve, the combustion rate is lowered, and the combustion noise is suppressed, accordingly. Japanese Laid-Open Patent Publication No. 2000-249020 discloses such control for lowering fuel pressure.

Other measures for suppressing combustion noise include a method disclosed in Japanese Laid-Open Patent Publication No. 1-313672, in which the ignition timing of fuel is retarded so that the combustion rate is decreased, and a method disclosed in Japanese Laid-Open Patent Publication No. 11-93731, in which fuel is injected into a cylinder in several times per cycle.

However, if the fuel pressure is lowered to reduce noise in a fuel pressurizing and supplying system and combustion noise, fuel will be insufficiently atomized, and the fuel penetration will be reduced. Therefore, formation of air-fuel mixture is likely to deteriorate, accordingly. As a result, the combustion state can deteriorate. The combustion state when fuel is injected from an in-cylinder injection valve is more susceptible to disturbance than the combustion state when fuel is injected from an intake port injection valve. Therefore, retarding the ignition timing of fuel and injecting fuel in several times per cycle as described above can also cause combustion to deteriorate.

SUMMARY OF THE INVENTION

Accordingly, it is an objective of the present invention to provide a fuel injection control apparatus and a fuel injection control method that readily prevent combustion state from deteriorating in an internal combustion engine that includes a fuel injection valve for injecting fuel into a cylinder in addition to a fuel injection valve for injecting fuel into an intake passage.

To achieve the foregoing and other objectives and in accordance with the purpose of the present invention, a fuel injection control apparatus for an internal combustion engine is provided. The engine has a first fuel injection valve for injecting fuel into a cylinder of the engine, and a second fuel injection valve for injecting fuel into an intake passage connected to the cylinder. The apparatus includes control means, detecting means, and switching means. The control means controls the fuel injection valves in a fuel injection mode that corresponds to an operational state of the engine. The detecting means detects a combustion state in the cylinder. When deterioration of the combustion state is detected by the detecting means while the engine operational state is in a predetermined operational region where fuel is injected at least from the first fuel injection valve, the switching means switches the fuel injection mode such that the ratio of the amount of fuel injected from the first fuel injection valve to the entire amount of fuel supplied to the cylinder is decreased.

The present invention also provides a fuel injection control method for an internal combustion engine. The engine has a first fuel injection valve for injecting fuel into a cylinder of the engine, and a second fuel injection valve for injecting fuel into an intake passage connected to the cylinder. The method includes: controlling the fuel injection valves in a fuel injection mode that corresponds to an operational state of the engine; detecting a combustion state in the cylinder; and decreasing the ratio of the amount of fuel injected from the first fuel injection valve to the entire amount of fuel supplied to the cylinder when deterioration of the combustion state is detected while the engine operational state is in a predetermined operational region where fuel is injected at least from the first fuel injection valve.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 3.

Figure 1:
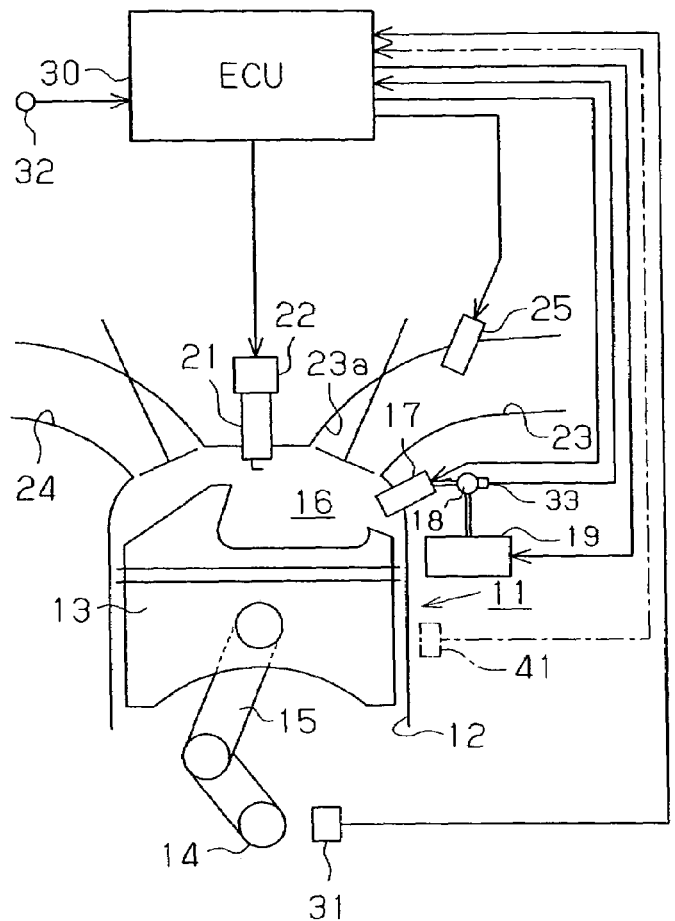
FIG. 1 is a block diagram illustrating a fuel injection control apparatus for an internal combustion engine according to a first embodiment of the present invention.

As shown in FIG. 1, a fuel injection control apparatus according to this embodiment is applied to a four-cycle cylinder injection internal combustion engine 11. The engine 11 includes a piston 13 accommodated in a cylinder 12. The piston 13 is connected via a connecting rod 15 to a crankshaft 14, which is the output shaft for the engine 11. The connecting rod 15 converts reciprocation of the piston 13 into rotation of the crankshaft 14.

A combustion chamber 16 is defined in the cylinder 12 above the piston 13. The engine 11 includes a first fuel injection valve, which is an in-cylinder injection valve 17. The in-cylinder injection valve 17 directly injects fuel into the combustion chamber 16. The in-cylinder injection valve 17 is connected to a high pressure fuel pipe, which is a delivery pipe 18. The delivery pipe 18 supplies highly pressurized fuel to the in-cylinder injection valve 17. Fuel is drawn up from a fuel tank (not shown) and then sent to a high pressure fuel pump, which is a supply pump 19. The supply pump 19 pressurizes the fuel and supplies it to the delivery pipe 18. Fuel injection pressure of the in-cylinder injection valve 17 is set based on the fuel pressure in the delivery pipe 18. When the in-cylinder injection valve 17 is actuated to open, fuel is injected into the combustion chamber 16.

The engine 11 includes an ignition plug 21 that ignites the air-fuel mixture generated in the combustion chamber 16. The timing for igniting the air-fuel mixture by the ignition plug 21 is adjusted by an igniter 22 provided above the ignition plug 21. The upper end face of the piston 13 is shaped to be suitable for generation of stratified air-fuel mixture with fuel injected from the in-cylinder injection valve 17, and permitting the air-fuel mixture to reach the vicinity of the ignition plug 21 at the ignition timing.

The combustion chamber 16 is connected to an intake passage 23 and an exhaust passage 24. The joint between the combustion chamber 16 and the intake passage 23 forms an intake port 23a. A second fuel injection valve, which is an intake port injection valve 25, is provided to be exposed to the intake passage 23. The intake port injection valve 25 injects fuel toward the intake port 23a. The intake port injection valve 25 receives highly pressurized fuel through a fuel supply mechanism (not shown). The pressure of the supplied fuel is adjusted to a predetermined value. When the intake port injection valve 25 is actuated to open, fuel is injected toward the intake port 23a. The second fuel injection valve is not limited to the intake port injection valve 25 provided in the vicinity of the intake port 23a, but may be provided in a surge tank in the intake passage 23.

The fuel injection apparatus includes an electronic control unit (ECU) 30 that controls the ignition plug 21 and the igniter 22, and various sensors used in control executed by the ECU 30. The ECU 30 is constructed with a microcomputer as the dominant constituent, and includes a central processing unit (CPU), read only memory (ROM), and random access memory (RAM).

In this embodiment, as sensors for detecting the operational state of the engine 11, a rotational speed sensor 31 and a pedal sensor 32 are provided. The rotational speed sensor 31 detects the number of revolutions of the crankshaft 14 per unit time, or the engine speed, and the pedal sensor 32 detects the depression amount of an acceleration pedal (not shown). The rotational speed sensor 31 also functions as a sensor that detects the combustion state of the engine 11. In this embodiment, the rotational speed sensor 31 and the ECU 30 form detecting means. A fuel pressure sensor 33 is located in the delivery pipe 18 to detect the fuel pressure in the delivery pipe 18. Detection signals of these sensors 31 to 33 are sent to the ECU 30.

Based on detection signals from the rotational speed sensor 31 and the pedal sensor 32, the ECU 30 detects the engine operational state and determines a fuel injection mode according to the detected engine operational state. The ECU 30 then sets the fuel injection timing and the fuel injection amount according to the determined fuel injection mode. In accordance with the set fuel injection timing and fuel injection amount, the ECU 30 causes at least one of the in-cylinder injection valve 17 and the intake port injection valve 25 to inject fuel. The fuel injection amount is determined based on the fuel injection pressure and the fuel injection duration.

Based on a detection signal from the fuel pressure sensor 33, the ECU 30 controls the fuel pressure in the delivery pipe 18. Specifically, the ECU 30 computes a target value of the fuel pressure in the delivery pipe 18 based on the engine operational state at every given point in time, and compares the target fuel pressure with the fuel pressure in the delivery pipe 18 that is actually detected. Then, based on the result of the comparison, the ECU 30 adjusts the amount of fuel supplied by the supply pump 19 such that the fuel pressure in the delivery pipe 18 seeks the target pressure value. The adjustment of the amount of supplied fuel in this manner permits the fuel pressure in the delivery pipe 18, in other words, the fuel injection pressure of the in-cylinder injection valve 17, to correspond to the engine operational state.

The target fuel pressure values are obtained in advance as pressure values each suitable for a given operational state of the engine. Function data defining the relationship of the target fuel pressure with the engine rotational speed and the fuel injection amount is stored as a map shown in FIG. 2 in ROM in the ECU 30. When determining the target fuel pressure value, the ECU 30 refers to the map of FIG. 2.

The relationship between the operational state of the internal combustion engine 11 of the present embodiment and a noise region will now described with reference to FIG. 2.

In a fuel pressuring system for supplying highly pressurized fuel to the in-cylinder injection valve 17, pressurizing and supplying operations of fuel generates mechanical noise, for example, noise of a valve body contacting a valve seat of a spill valve in the supply pump 19 and similar noise in the in-cylinder injection valve 17. Normally, the higher the fuel pressure in the delivery pipe 18, the more increased the noise.

When the engine operational state is in a high rotational speed and high load region, the fuel pressure in the delivery pipe 18 is adjusted to be the highest target fuel pressure value PFH (for example, 10 MPa to 12 MPa). When the engine operational state is in a low rotational speed and low load region, the fuel pressure in the delivery pipe 18 is adjusted to be a lower target fuel pressure value PFL (for example, 4 MPa). Therefore, noise generated in the fuel pressurizing and supplying system is relatively great when the engine operational state is in the high rotation and high load region than when the engine operational state is in the low rotational speed and low load region. However, when the engine operational state is in the high rotational speed and high load region, combustion noise of the engine 11 and the road noise mask the noise generated in the fuel pressurizing and supplying system. Thus, the noise of the fuel pressuring system hardly disturbs the driver. On the other hand, when the engine operational state is in the low rotational speed and low load region, combustion noise of the engine 11 and the road noise are small. Thus, the noise of the fuel pressuring system is likely to disturb the driver. Therefore, noise generated in the fuel pressurizing and supplying system becomes a problem in a region where the engine operational state is in the low rotational speed and low load region, particularly, when the engine 11 is idling.

For these reasons, the idling-region is set as the noise region in this embodiment. The target fuel pressure value when the engine operational state is in the noise region is a value PFI (for example, 2 MPa), which is lower than the value PFL for the engine operational state being in the low rotational speed and low load region. Therefore, when the engine operational state is in the cross-hatched region in FIG. 2, the ECU 30 lowers the fuel pressure in the delivery pipe 18 to the target fuel pressure value PFI.

When the fuel pressure is controlled in such a manner, the atomization of fuel spray and the penetration of fuel spray can deteriorate. This can degrade the combustion state of the engine 11. Therefore, the ECU 30 monitors the engine combustion state based on detection signals from the rotational speed sensor 31. When detecting that the engine combustion state has deteriorated or when deterioration is predicted, the ECU 30 lowers the ratio of the amount of fuel injected from the in-cylinder injection valve 17 to the entire fuel injection amount.

Figure 3:
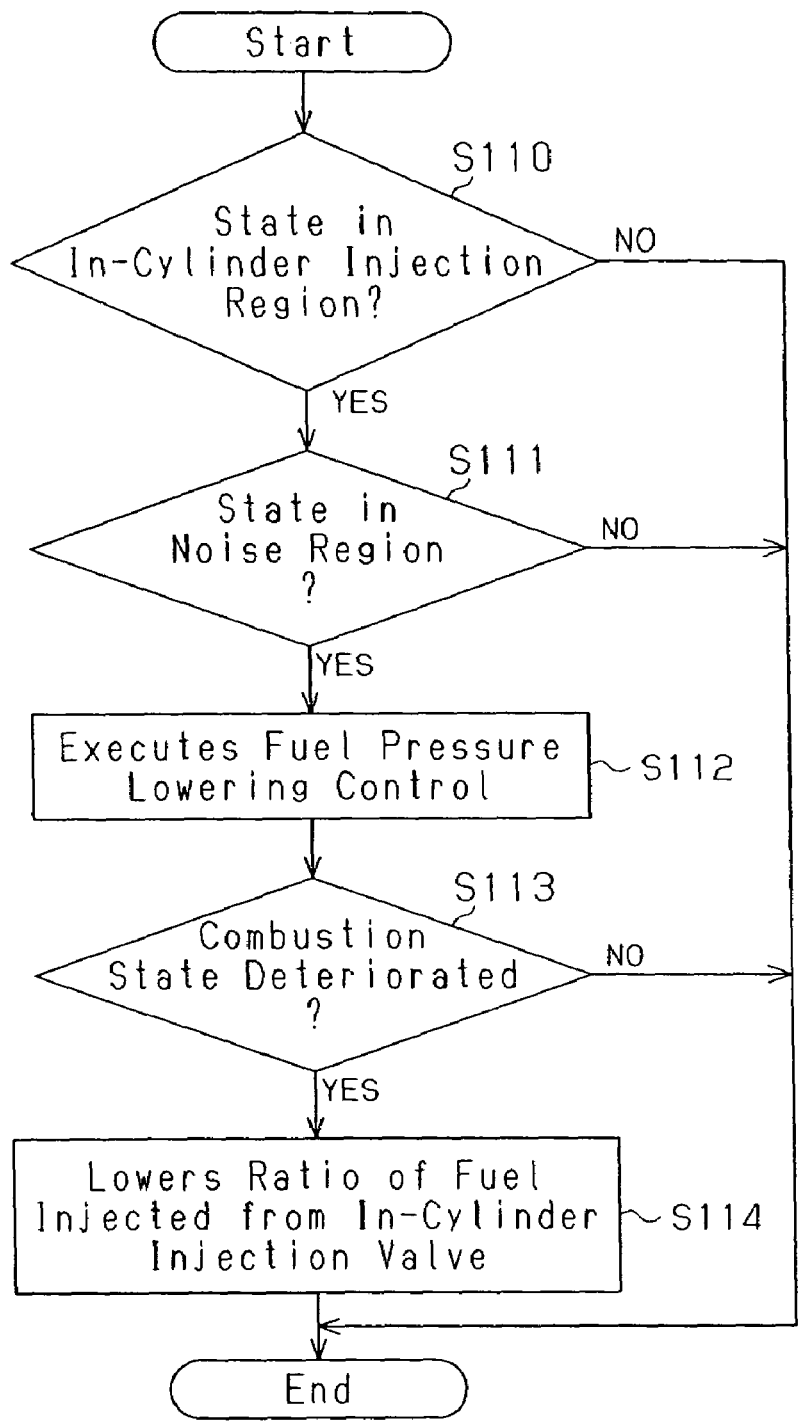
FIG. 3 is a flowchart showing a procedure for controlling fuel injection.

FIG. 3 is a flowchart showing a procedure of fuel injection control according to this embodiment. The control routine shown in FIG. 3 is executed by the ECU 30, which functions as switching means that switches the fuel injection mode according to a program stored in the ROM of the ECU 30.

When entering the routine, the ECU 30 at step S110 determines whether the engine operational state is in a region where fuel needs to be injected into the cylinder, or in an in-cylinder injection region. When determining that the engine operational state is in the in-cylinder injection region, the ECU 30 proceeds to step S111. At step S111, the ECU 30 determines whether the engine operational state is in the noise region. Specifically, the ECU 30 determines whether the engine is idling.

When determining that the engine operational state is in the noise region at step S111, the ECU 30 proceeds to step S112. At step S112, the ECU 30 executes fuel pressure lowering control as a measure against noise generated in the fuel pressurizing and supplying system. Specifically, the ECU 30 lowers the fuel pressure in the delivery pipe 18 to the target fuel pressure value PFI.

At the subsequent step S113, the ECU 30 determines whether the fuel combustion state has deteriorated based on a detection signal from the rotational speed sensor 31. When determining that the combustion state has deteriorated, the ECU 30 lowers the ratio of the amount of fuel injected from the in-cylinder injection valve 17 to the entire fuel injection amount, thereby suppressing fuel injection from the in-cylinder injection valve 17, which is susceptible to the fuel pressure lowering control.

Specifically, in a case where the in-cylinder injection valve 17 and the intake port injection valve 25 are both injecting fuel, the ECU 30 lowers the ratio of the amount of fuel injected from the in-cylinder injection valve 17 until the combustion state is improved, while increasing the ratio of the amount of fuel injected from the intake port injection valve 25. In contrast, in a case where only the in-cylinder injection valve 17 is injecting fuel, the ECU 30 lowers the ratio of the amount of fuel injected from the in-cylinder injection valve 17 until the combustion state is improved, while starting fuel injection from the intake port injection valve 25.

On the other hand, when determining that the combustion state has not deteriorated at step S113, the ECU 30 continues operating the engine 11 while maintaining the ratio of the amount of fuel injected from the in-cylinder injection valve 17 to the entire fuel injection amount, that is, without changing the fuel injection mode. In this case, a favorable engine combustion state is maintained.

This embodiment provides the following advantages.

(1) When the engine operational state is in the in-cylinder injection region, the fuel pressure lowering control is executed as a measure against noise generated in the fuel pressurizing and supplying system. At this time, if the combustion state deteriorates due to the decrease in the fuel pressure, the ratio of the amount of fuel injected from the in-cylinder injection valve 17 to the entire fuel injection amount is decreased. As a result, the engine combustion state is prevented from deteriorating while suppressing noise generated in the fuel pressurizing and supplying system.

(2) When the engine operational state is in the in-cylinder injection region, the ratio of the amount of fuel injected from the in-cylinder injection valve 17 to the entire fuel injection amount is maintained if the combustion mode does not deteriorate due to the execution of the fuel pressure lowering control as a measure against noise generated in the fuel pressurizing and supplying system. That is, in this case, the operation of the engine 11 is continued without changing the fuel injection mode. Therefore, a favorable combustion state is maintained while suppressing noise generated in the fuel pressurizing and supplying system.

(3) The fuel pressure in the delivery pipe 18 is controlled to be a target fuel pressure value that corresponds to the engine operational state based on the map (FIG. 2) for determining the fuel pressure. Therefore, when the engine operational state is in the low rotational speed and low load region, noise generated in the fuel pressurizing and supplying system is suppressed by a greater degree than when the engine operational state is in the high rotational speed and high load region. Such noise particularly disturbs the driver when the engine is idling. Therefore, in the idling region, the fuel pressure is further lowered and the combustion state is likely to deteriorate. In the present embodiment, since the ratio of the amount of fuel injected from the in-cylinder injection valve 17 to the entire fuel injection amount in the idling region is lowered, the combustion state is prevented from deteriorating while taking a suitable measure against noise in the idling region.

A second embodiment of the present invention will now be described with reference to FIG. 4. Like or the same reference numerals are given to those components that are like or the same as the corresponding components of the first embodiment and detailed explanations are omitted.

In this embodiment, when the engine operational state is in the region for in-cylinder fuel injection and combustion noise is a problem, the combustion rate is lowered as a measure against the combustion noise. This embodiment is characterized in that during the control for lowering the combustion rate, the fuel injection mode is switched such that the ratio of the amount of fuel injected from the in-cylinder injection valve 17 to the entire fuel injection amount is lowered, thereby preventing the combustion state from deteriorating due to the combustion rate lowering control.

Combustion noise when the engine operational state is in the in-cylinder injection region increases as the rotational speed and the engine load increase. Therefore, in this embodiment, the high rotational speed and high load region is set as a combustion noise region. When the engine operational state is in the combustion noise region, combustion rate lowering control is executed. Specifically, the ECU 30 lowers the combustion rate by retarding the timing at which the ignition plug 21 ignites fuel or by causing the in-cylinder injection valve 17 to inject fuel in several times per cycle. Such combustion rate lowering control can be performed by lowering the fuel pressure in the delivery pipe 18 as described in the first embodiment.

Also, as in the first embodiment, the ECU 30 monitors the combustion state based on a detection signal from the rotational speed sensor 31. When detecting that the combustion state has deteriorated or when deterioration is predicted based on a detection signal, the ECU 30 lowers the ratio of the amount of fuel injected from the in-cylinder injection valve 17 to the entire fuel injection amount.

Figure 4:
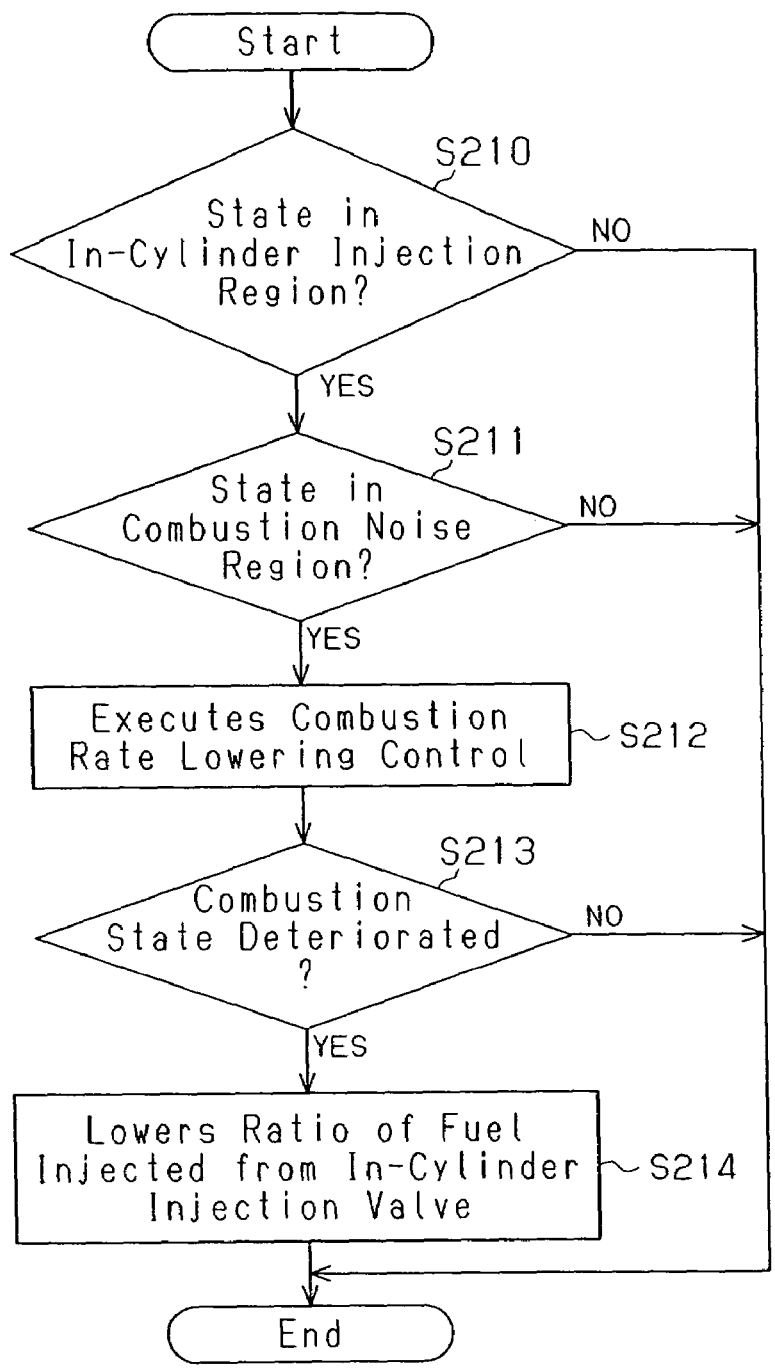
FIG. 4 is a flowchart illustrating a routine for controlling fuel injection according to a second embodiment of the present invention.

FIG. 4 is a flowchart showing a procedure of fuel injection control according to this embodiment. As in the first embodiment, the control routine shown in FIG. 4 is executed by the ECU 30 according to a program stored in the ROM of the ECU 30.

When entering the routine, the ECU 30 at step S210 determines whether the engine operational state is in the in-cylinder injection region. When determining that the engine operational state is in the in-cylinder injection region, the ECU 30 proceeds to step S211. At step S211, the ECU 30 determines whether the engine operational state is in the combustion noise region. Specifically, the ECU 30 determines whether the engine operational state is in the high rotational speed and high load region.

When determining that the engine operational state is in the combustion noise region at step S211, the ECU 30 proceeds to step S212. At step S212, the ECU 30 executes combustion rate lowering control as a measure against combustion noise. Specifically, the ECU 30 retards the ignition timing of fuel, thereby lowering the combustion rate.

At the subsequent step S213, the ECU 30 determines whether the fuel combustion state has deteriorated based on a detection signal from the rotational speed sensor 31. When determining that the combustion state has deteriorated, the ECU 30 lowers the ratio of the amount of fuel injected from the in-cylinder injection valve 17 to the entire fuel injection amount, thereby suppressing fuel injection from the in-cylinder injection valve 17, which is susceptible to the combustion lowering control.

Specifically, in a case where the in-cylinder injection valve 17 and the intake port injection valve 25 are both injecting fuel, the ECU 30 lowers the ratio of the amount of fuel injected from the in-cylinder injection fuel 17 until the combustion state is improved, while increasing the ratio of the amount of fuel injected from the intake port injection valve 25. In contrast, in a case where only the in-cylinder injection valve 17 is injecting fuel, the ECU 30 lowers the ratio of the amount of fuel injected from the in-cylinder injection fuel 17 until the combustion state is improved, while starting fuel injection from the intake port injection valve 25.

On the other hand, when determining that the combustion state has not deteriorated at step S213, the ECU 30 continues operating the engine 11 while maintaining the ratio of the amount of fuel injected from the in-cylinder injection valve 17 to the entire fuel injection amount, that is, without changing the fuel injection mode. In this case, a favorable combustion state is maintained.

This embodiment provides the following advantages.

(1) When the engine operational state is in the in-cylinder injection region, the combustion rate lowering control is executed as a measure against combustion noise. At this time, if the combustion state deteriorates due to decrease in the combustion rate, the ratio of the amount of fuel injected from the in-cylinder injection valve 17 to the entire fuel injection amount is decreased. As a result, the engine combustion state is prevented from deteriorating while suppressing combustion noise.

(2) When the engine operational state is in the in-cylinder injection region, the ratio of the amount of fuel injected from the in-cylinder injection valve 17 to the entire fuel injection amount is maintained if the combustion mode does not deteriorate due to the execution of the combustion rate lowering control as a measure against combustion noise. That is, in this case, the operation of the engine 11 is continued without changing the fuel injection mode. Therefore, a favorable combustion state is maintained while suppressing combustion noise.

(3) If the combustion rate lowering control is executed while the engine operational state is in the high rotational speed and high load region, and the combustion state deteriorates due to the control, the ratio of the amount of fuel injected from the in-cylinder injection valve 17 to the entire fuel injection amount is decreased. Therefore, when the engine operational state is in the high rotational speed and high load region, the combustion state is prevented from deteriorating while taking a suitable measure against combustion noise.

The above illustrated embodiments may be modified as follows.

The sensor for detecting deterioration of combustion state is not limited to the rotational speed sensor 31. For example, a combustion pressure sensor for detecting the combustion pressure in the combustion chamber 16 may be used. The configuration with such a combustion pressure sensor improves the detection accuracy of combustion state.

In the first embodiment, the region where a measure against noise is taken is not limited to the idling region of the engine. For example, when the engine operational state is in the low rotational speed and low load region, the fuel pressure may be lowered to the target fuel pressure value PFI, which is the same for the idling region, to take a measure against noise. In this case, the engine combustion state is likely to deteriorate as the fuel pressure is lowered. In such a case, the ratio of the amount of fuel injected from the in-cylinder injection valve 17 is decreased in accordance with the degree of deterioration of the combustion state. As a result, the engine combustion state is improved.

In the first embodiment, if the combustion state deteriorates when the fuel pressure lowering control is being executed as a measure against noise, the ratio of the amount of fuel injected from the in-cylinder injection valve 17 to the entire fuel injection amount is decreased. However, if the engine combustion state deteriorates while the fuel pressure is being adjusted according to the engine operational state, the ratio of the amount of fuel injected from the in-cylinder injection valve 17 may be lowered irrespective of the fuel pressure lowering control.

Figure 2:
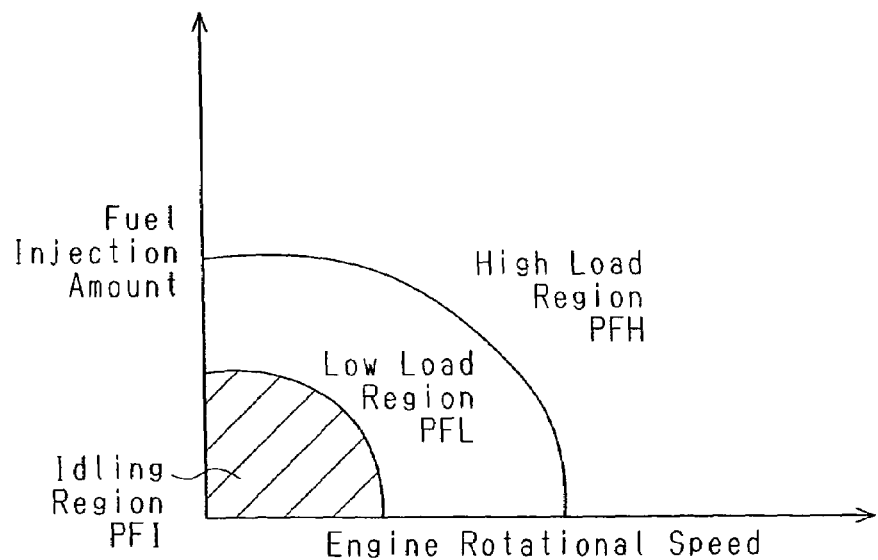
FIG. 2 is a graph showing a map for determining fuel pressure.

In the first embodiment, whether the engine operational state is in the noise region is determined based on the map shown in FIG. 2. However, as shown in FIG. 1, a noise sensor 41 for detecting noise generated in the fuel pressurizing and supplying system may be provided, and the ECU 30 may determine that the engine operational state is in the noise region when noise that surpasses a reference value is detected based on a detection signal from the noise sensor 41. When the engine operational state is in the noise region, the ECU 30 lowers the fuel pressure until the detected noise falls below the reference value. If deterioration of combustion state is detected in the course of lowering the fuel pressure, the ECU 30 lowers the ratio of the amount of fuel injected from the in-cylinder injection valve 17 to the entire fuel injection amount. According to this configuration, a measure against noise is taken not only against noise in the predetermined noise region but also against noise generated in the fuel pressuring system. Also, deterioration of the combustion state due to the measures against noise is prevented.

The sensor for detecting noise generated in the fuel pressurizing and supplying system is not limited to the noise sensor 41. At portions where noise is generated due to the transfer of highly pressurized fuel, mechanical vibration is generated. For example, vibration accompanying the action of a spill valve is generated. A vibration sensor for detecting such vibration may be provided, and noise may be detected based on a detection signal of such a sensor.

When a fuel pressure lowering control is executed, the map shown in FIG. 2 and the noise sensor 41 may be used in combination.

In the second embodiment, the region where a measure against combustion noise is taken is not limited to the high rotational speed and high load region of the engine. For example, when the engine operational state is in the low rotational speed and low load region, the combustion rate may be lowered to take a measure against combustion noise.

In the second embodiment, combustion noise may be detected by the noise sensor 41.

In the illustrated embodiments, the two cases where the fuel combustion mode is switched are described. That is, in the first embodiment, a case is described in which the fuel injection mode is switched if the combustion state deteriorates due to the fuel pressure lowering control as a measure against noise generated in the fuel pressurizing and supplying system. In the second embodiment, a case is described in which the fuel injection mode is switched if the combustion state deteriorates due to the combustion rate lowering control as a measure against combustion noise. However, in a case where the fuel pressure lowering control and the combustion rate lowering control are both being executed, the ratio of the amount of fuel injected from the in-cylinder injection valve 17 to the entire fuel injection amount may be decreased.

The present examples and embodiments are to be considered as illustrative and not restrictive and the invention is not to be limited to the details given herein, but may be modified within the scope and equivalence of the appended claims.

The invention claimed is:

1. A fuel injection control apparatus for an internal combustion engine, wherein the engine has a first fuel injection valve for injecting fuel into a cylinder of the engine, and a second fuel injection valve for injecting fuel into an intake passage connected to the cylinder, the apparatus comprising:

control means for controlling the fuel injection valves in a fuel injection mode that corresponds to an operational state of the engine;

detecting means for detecting a combustion state in the cylinder; and switching means, wherein, when deterioration of the combustion state is detected by the detecting means while the engine operational state is in a predetermined operational region where fuel is injected at least from the first fuel injection valve, the switching means switches the fuel injection mode such that the ratio of the amount of fuel injected from the first fuel injection valve to the entire amount of fuel supplied to the cylinder is decreased, wherein, when the pressure of fuel supplied to the first fuel injection valve is lowered, the switching means switches the fuel injection mode based on the detection of the combustion state.

2. The apparatus according to claim 1, wherein, when the engine operational state is in the predetermined operational region, fuel is injected from both of the first fuel injection valve and the second fuel injection valve, and wherein, when deterioration of the combustion state is detected by the detecting means, the switching means increases the ratio of the amount of fuel injected from the second fuel injection valve while decreasing the ratio of the amount of fuel injected from the first fuel injection valve.

3. The apparatus according to claim 1, wherein, when the engine operational state is in the predetermined operational region, fuel is injected only from the first fuel injection valve, and wherein, when deterioration of the combustion state is detected by the detecting means, the switching means causes the second fuel injection valve to start injecting fuel while decreasing the ratio of the amount of fuel injected from the first fuel injection valve.

4. The apparatus according to claim 1, wherein the control means lowers the pressure of fuel supplied to the first fuel injection valve when the engine operational state is in an idling region.

5. The apparatus according to claim 1, wherein the control means lowers the pressure of fuel supplied to the first fuel injection valve when the engine operational state is in a low rotational speed and low load region.

6. The apparatus according to claim 1, further comprising a noise sensor for detecting noise generated in a system that pressurizes fuel and supplies fuel to the first fuel injection valve, wherein, when the level of detected noise is higher than a predetermined reference value, the control means lowers the pressure of fuel supplied to the first fuel injection valve until the level of the noise becomes equal to or lower than the reference value.

7. The apparatus according to claim 1, wherein, when the combustion rate in the cylinder is lowered, the switching means switches the fuel injection mode based on the detection of the combustion state.

8. The apparatus according to claim 7, wherein the control means lowers the combustion rate in the cylinder when the engine operational state is in a high rotational speed and high load region.

9. The apparatus according to claim 7, further comprising a combustion noise sensor for detecting combustion noise of fuel in the cylinder, wherein, when the level of detected combustion noise is higher than a predetermined reference value, the control means lowers the pressure of fuel supplied to the first fuel injection valve until the level of the combustion noise becomes equal to or lower than the reference value.

10. The apparatus according to claim 1, wherein, when the combustion rate in the cylinder is lowered, the switching means switches the fuel injection mode based on the detection of the combustion state.

11. An internal combustion engine, comprising:
a cylinder;
an intake passage connected to the cylinder;
a first fuel injection valve for injecting fuel into the cylinder;
a second fuel injection valve for injecting fuel into the intake passage;
a controller for controlling the fuel injection valves in a fuel injection mode that corresponds to an operational state of the engine; and
a detection device for detecting a combustion state in the cylinder, wherein, when deterioration of the combustion state is detected by the detection device while the engine operational state is in a predetermined operational region where fuel is injected at least from the first fuel injection valve, the controller controls the fuel injection valves such that the ratio of the amount of fuel injected from the first fuel injection valve to the entire amount of fuel supplied to the cylinder is decreased;
wherein, when the pressure of fuel supplied to the first fuel injection valve is lowered, the controller controls the fuel injection valves such that the ratio of the amount of the fuel injected from the first fuel injection valve to the entire amount of fuel supplied to the cylinder is decreased.

12. The internal combustion engine according to claim 11, wherein, when the engine operational state is in the predetermined operational region, fuel is injected from both of the first fuel injection valve and the second fuel injection valve, and wherein, when deterioration of the combustion state is detected by the detection device, the controller increases the ratio of the amount of fuel injected from the second fuel injection valve while decreasing the ratio of the amount of fuel injected from the first fuel injection valve.

13. The internal combustion engine according to claim 11, wherein, when the engine operational state is in the predetermined operational region, fuel is injected only from the first fuel injection valve, and wherein, when deterioration of the combustion state is detected by the detection device, the controller causes the second fuel injection valve to start injecting fuel while decreasing the ratio of the amount of fuel injected from the first fuel injection valve.

14. A fuel injection control method for an internal combustion engine, wherein the engine has a first fuel injection valve for injecting fuel into a cylinder of the engine, and a second fuel injection valve for injecting fuel into an intake passage connected to the cylinder, the method comprising:
controlling the fuel injection valves in a fuel injection mode that corresponds to an operational state of the engine;
detecting a combustion state in the cylinder; and
decreasing the ratio of the amount of fuel injected from the first fuel injection valve to the entire amount of fuel supplied to the cylinder when deterioration of the combustion state is detected while the engine operational state is in a predetermined operational region where fuel is injected at least from the first fuel injection valve; and
decreasing the ratio of the amount of fuel injected from the first fuel injection valve to the entire amount of fuel supplied to the cylinder when the pressure of fuel supplied to the first fuel injection valve is lowered.

15. The method according to claim 14, wherein, when the engine operational state is in the predetermined operational region, fuel is injected from both of the first fuel injection valve and the second fuel injection valve, and wherein, when deterioration of the combustion state is detected, the ratio of the amount of fuel injected from the second fuel injection valve is increased while the ratio of the amount of fuel injected from the first fuel injection valve is decreased.

16. The method according to claim 14, wherein, when the engine operational state is in the predetermined operational region, fuel is injected only from the first fuel injection valve, and wherein, when deterioration of the combustion state is detected, the second fuel injection valve is caused to start injecting fuel while the ratio of the amount of fuel injected from the first fuel injection valve is decreased.

* * * * *